US008386768B2

(12) United States Patent
Nair et al.

(10) Patent No.: US 8,386,768 B2
(45) Date of Patent: Feb. 26, 2013

(54) HIGH PERFORMANCE DATA ENCRYPTION SERVER AND METHOD FOR TRANSPARENTLY ENCRYPTING/DECRYPTING DATA

(75) Inventors: Sushil Nair, San Jose, CA (US); Anatol Zolotusky, Palo Alto, CA (US); Claude Charpentier, Redwood City, CA (US); Brian Metzger, San Jose, CA (US)

(73) Assignee: SafeNet, Inc., Belcamp, MD (US)

( * ) Notice: Subject to any disclaimer, the term of this patent is extended or adjusted under 35 U.S.C. 154(b) by 1172 days.

(21) Appl. No.: 11/704,705

(22) Filed: Feb. 8, 2007

(65) Prior Publication Data

US 2008/0034199 A1 Feb. 7, 2008

Related U.S. Application Data

(60) Provisional application No. 60/771,947, filed on Feb. 8, 2006, provisional application No. 60/774,897, filed on Feb. 16, 2006.

(51) Int. Cl.
*H04L 29/06* (2006.01)
(52) U.S. Cl. ......................................... 713/153; 713/165
(58) Field of Classification Search .................. 713/153, 713/165
See application file for complete search history.

(56) References Cited

U.S. PATENT DOCUMENTS

| | | | |
|---|---|---|---|
| 4,386,416 A | 5/1983 | Giltner | |
| 4,964,164 A | 10/1990 | Fiat | |
| 5,142,272 A | 8/1992 | Kondo | |
| 5,222,133 A | 6/1993 | Chou et al. | |
| 5,463,702 A | 10/1995 | Trueblood | |
| 5,557,712 A | 9/1996 | Guay | |
| 5,734,744 A | 3/1998 | Wittenstein | |
| 5,764,235 A | 6/1998 | Hunt et al. | |
| 5,825,917 A | 10/1998 | Suzuki | |
| 5,828,832 A | 10/1998 | Holden et al. | |
| 5,848,159 A | 12/1998 | Collins et al. | |
| 5,854,841 A * | 12/1998 | Nakata et al. | .................. 713/152 |
| 5,923,756 A | 7/1999 | Shambroom | |
| 5,963,642 A | 10/1999 | Goldstein | |
| 5,999,629 A | 12/1999 | Heer et al. | |
| 6,021,198 A | 2/2000 | Anigbogu | |
| 6,061,448 A | 5/2000 | Smith et al. | |

(Continued)

FOREIGN PATENT DOCUMENTS

EP 0 946 018 B1 9/1999
WO WO 01/03398 A3 1/2001

(Continued)

OTHER PUBLICATIONS

U.S. Appl. No. 10/526,252, filed Feb. 24, 2005, Fountain et al.

(Continued)

*Primary Examiner* — Gilberto Barron, Jr.
*Assistant Examiner* — Simon Kanaan
(74) *Attorney, Agent, or Firm* — Drinker Biddle & Reath LLP

(57) ABSTRACT

High-performance data encryption/decryption server and method for transparently encrypting/decrypting data. System and method for encryption and/or decryption cryptographic services that have applicability small and large databases and especially to encryption and/or decryption of bulk data. Method for transparently applying a cryptographic operation to application-specific data. Encryption server for transparent encryption and decryption of application specific data. Method for transparently encrypting application specific data. Computer program stored on a computer readable media for modifying the operation of a computer process implementing a method for transparently encrypting application specific data. System and appliance for transparently encrypting application specific data. System for transparently applying a cryptographic operation to application-specific data.

24 Claims, 2 Drawing Sheets

U.S. PATENT DOCUMENTS

| | | | |
|---|---|---|---|
| 6,073,242 | A | 6/2000 | Hardy et al. |
| 6,081,598 | A | 6/2000 | Dai |
| 6,081,900 | A | 6/2000 | Subramaniam et al. |
| 6,094,485 | A | 7/2000 | Weinstein et al. |
| 6,098,093 | A | 8/2000 | Bayeh |
| 6,098,096 | A | 8/2000 | Tsirigotis et al. |
| 6,105,012 | A | 8/2000 | Chang et al. |
| 6,154,542 | A | 11/2000 | Crandall |
| 6,202,157 | B1 | 3/2001 | Brownlie et al. |
| 6,216,212 | B1 | 4/2001 | Challenger et al. |
| 6,233,565 | B1 | 5/2001 | Lewis et al. |
| 6,233,577 | B1 | 5/2001 | Ramasubramani et al. |
| 6,237,033 | B1 | 5/2001 | Doeberl et al. |
| 6,321,201 | B1 | 11/2001 | Dahl |
| 6,396,926 | B1 | 5/2002 | Takagi et al. |
| 6,397,330 | B1 | 5/2002 | Elgamal et al. |
| 6,442,607 | B1 | 8/2002 | Korn et al. |
| 6,473,802 | B2 | 10/2002 | Masters |
| 6,477,646 | B1 | 11/2002 | Krishna et al. |
| 6,502,135 | B1 | 12/2002 | Munger et al. |
| 6,519,365 | B2 | 2/2003 | Kondo et al. |
| 6,535,915 | B1 * | 3/2003 | Valys et al. .................. 709/222 |
| 6,553,393 | B1 | 4/2003 | Eilbott et al. |
| 6,578,061 | B1 | 6/2003 | Aoki et al. |
| 6,584,567 | B1 | 6/2003 | Bellwood et al. |
| 6,587,866 | B1 | 7/2003 | Modi et al. |
| 6,598,167 | B2 | 7/2003 | Devine et al. |
| 6,615,276 | B1 | 9/2003 | Mastrianni et al. |
| 6,621,505 | B1 | 9/2003 | Beauchamp |
| 6,640,302 | B1 | 10/2003 | Subramaniam et al. |
| 6,678,733 | B1 | 1/2004 | Brown et al. |
| 6,681,327 | B1 | 1/2004 | Jardin |
| 6,751,677 | B1 | 6/2004 | Ilnicki et al. |
| 6,757,823 | B1 | 6/2004 | Rao et al. |
| 6,763,459 | B1 | 7/2004 | Corella |
| 6,785,810 | B1 | 8/2004 | Lirov et al. |
| 6,874,089 | B2 | 3/2005 | Dick et al. |
| 6,886,095 | B1 | 4/2005 | Hind et al. |
| 6,915,427 | B2 | 7/2005 | Maruyama et al. |
| 6,941,459 | B1 | 9/2005 | Hind et al. |
| 6,963,980 | B1 | 11/2005 | Mattsson |
| 6,990,636 | B2 | 1/2006 | Beauchamp |
| 6,990,660 | B2 | 1/2006 | Moshir et al. |
| 7,137,143 | B2 | 11/2006 | Chawla et al. |
| 7,152,244 | B2 | 12/2006 | Toomey |
| 7,266,699 | B2 | 9/2007 | Newman et al. |
| 7,272,229 | B2 | 9/2007 | Nakano et al. |
| 7,325,129 | B1 | 1/2008 | Mattsson et al. |
| 2002/0012473 | A1 | 1/2002 | Kondo et al. |
| 2002/0015497 | A1 | 2/2002 | Maruyama et al. |
| 2002/0016911 | A1 | 2/2002 | Chawla et al. |
| 2002/0039420 | A1 | 4/2002 | Shacham et al. |
| 2002/0066038 | A1 | 5/2002 | Mattsson |
| 2002/0073232 | A1 | 6/2002 | Hong et al. |
| 2002/0087884 | A1 | 7/2002 | Shacham et al. |
| 2002/0100036 | A1 | 7/2002 | Moshir et al. |
| 2002/0112167 | A1 | 8/2002 | Boneh et al. |
| 2003/0014650 | A1 | 1/2003 | Freed et al. |
| 2003/0039362 | A1 | 2/2003 | Califano et al. |
| 2003/0046572 | A1 | 3/2003 | Newman et al. |
| 2003/0065919 | A1 | 4/2003 | Albert et al. |
| 2003/0097428 | A1 | 5/2003 | Afkhami |
| 2003/0101355 | A1 | 5/2003 | Mattsson |
| 2003/0123671 | A1 | 7/2003 | He et al. |
| 2003/0156719 | A1 | 8/2003 | Cronce |
| 2003/0197733 | A1 | 10/2003 | Beauchamp |
| 2003/0204513 | A1 | 10/2003 | Bumbulis |
| 2004/0015725 | A1 | 1/2004 | Boneh et al. |
| 2004/0078568 | A1 * | 4/2004 | Pham et al. .................. 713/165 |
| 2004/0133775 | A1 * | 7/2004 | Callas et al. .................. 713/153 |
| 2004/0255140 | A1 | 12/2004 | Margolus et al. |
| 2005/0004924 | A1 | 1/2005 | Baldwin |
| 2006/0041533 | A1 | 2/2006 | Koyfman |
| 2006/0149962 | A1 * | 7/2006 | Fountain et al. ............. 713/151 |
| 2007/0074047 | A1 | 3/2007 | Metzger et al. |
| 2007/0079140 | A1 * | 4/2007 | Metzger et al. ............... 713/189 |
| 2007/0079386 | A1 | 4/2007 | Metzger et al. |

FOREIGN PATENT DOCUMENTS

| | | | |
|---|---|---|---|
| WO | WO 02/101605 A2 | 12/2002 | |

OTHER PUBLICATIONS

U.S. Appl. No. 10/850,827 filed May 20, 2004, Koyfman.
U.S. Appl. No. 11/236,046, filed Sep. 26, 2005, Metzger et al.
U.S. Appl. No. 11/236,294, filed Sep. 26, 2005, Metzger et al.
U.S. Appl. No. 11/236,061, filed Sep. 26, 2005, Metzger et al.
Wagner, Neal R., "The Laws of Cryptography: The RSA Cryptosystem", <http://www.cs.utsa.edu/~wagner/laws/RSA.html>.
Boneh, et al., "Efficient Generation of Shared RSA Keys," (extended abstract).
U.S. Appl. No. 11/341,060, filed Jan. 27, 2006, Metzger et al.
Menezes, A., et al., "Handbook of Applied Cryptography," 1996 CRC Press, pp. §8.2-8.3 and §14.5.
RSA "PKCS #1 v2.0 Amendment 1: Multi-Prime RSA," 2000.
U.S. Appl. No.1 11/341,060, filed Jan. 27, 2006, Metzger et al.
Alteon Web Systems: "The Next Step in Server Loading Balancing" Nov. 1999, Retrieved from the Internet: URL:http:/www.nortelnetworks.com/products/library/collateral/intel_int/webworking_wp.pdf, Retrieved on Mar. 2, 2004; pp. 4-11.
Alteon Web Systems: "Networking with the Web in Mind" May 1999, Retrieved from the Internet: URL:http:/www.nortelnetworks.com/products/library/collateral/intel_int/webworking_wp.pdf, Retrieved on Mar. 2, 2004; p. 1, pp. 3-7.
Boneh, D., "Twenty Years of Attacks on the RSA Cyrptosystem," Notices of the AMS, vol. 46, No. 2, pp. 203-213, 1999.
Boneh, et al., "An Attack on RSA Given a Small Fraction of the Private Key Bits," ASIACRYPT '98, LNCS 1514, pp. 25-34, 1998.
Boneh, et al., "Cryptanalysis of RSA with Private Key d Less than N0.292," (extended abstract), 1999.
Durfee, G., et al., "Cryptanalysis of the RSA Schemes with Short Secret Exponent from Asiacrypt '99," ASIACRYPT 2000, LNCS 1976, pp. 14-29, 2000.
Fiat, A. "Batch RSA, (digital signatures and public key krypto-systems)" Advances in Crytology—Cryto '89 Proceedings Aug. 20-24, 1989, Springer-Verlag.
Großschädl, J., et al., "The Chinese Remainder Theorem and its Application in a High-Speed RSA Crypto Chip," 2000.
Herda, S., "Non-repudiation: Constituting evidence and proof in digital cooperation," Computer Standards and Interfaces, Elsevier Sequoia, Lausanne, CH, 17:1 (69-79) 1995.
Immerman, N., "Homework 4 with Extensive Hints," 2000.
Menezes, A., et al., "Handbook of Applied Cryptography," 1996 CRC Press, pp. §8.2-8.3 and §14.
Netscape; "Netscape Proxy Server Administrator's Guide, Version 3.5 for Unix"; Feb. 25, 1998; Retrieved from the Internet.
Oppliger, R.; "Authorization Methods for E-Commerce Applications"; 1999.
RSA Laboratories: "PKCS #7: Cryptographic Message Syntax Standard, Version 1.5," RSA Laboratories Technical Note, pp. 1-30, Nov. 1, 1993.
"Security Protocols Overview (An RSA Data Security Brief)", RSA Data Security, 1999, http://www.comms.scitech.susx.ac.uk/fft/crypto/security_protocols.pdf, pp. 1-4.
Shacham, H., et al., "Improving SSL Handsake Performance via Batching," Topics in Cryptology, pp. 28-43, 2001.
Shand, M., et al., "Fast Implementations of RSA Cryptography," 1993.
Sherif, M.H., et al., "SET and SSL: Electronic Payments on the Internet," IEEE, pp. 353-358 (1998).
Stallings, W., "IP Security," Network Security Essentials, Applications and Standards, Chapters 6 and 7, pp. 162-223, 2000.
Takagi, T., "Fast RSA-Type Cryptosystem Modulo pkq," 1998.
Takagi, T., "Fast RSA-Type Cryptosystems Using N-Adic Expansion," Advances in Technology—CRYPTO '97, LNCS 1294, pp. 372-384, 1997.
Wiener, M., "Cryptanalysis of Short RSA Secret Exponents," 1989.

* cited by examiner

HIGH PERFORMANCE DATA ENCRYPTION SERVER AND METHOD FOR TRANSPARENTLY ENCRYPTING/DECRYPTING DATA

CROSS REFERENCE TO RELATED APPLICATIONS

This application claims priority under 35 U.S.C §119(e) to U.S. Provisional Application No. 60/771,947 filed Feb. 8, 2006; entitled "High Performance Encryption Server," and to U.S. Provisional Application No. 60/774,897 filed Feb. 16, 2006, entitled "Bulk Data Loader For A DB2 Database"; each of which patent applications are hereby incorporated by reference.

FIELD OF THE INVENTION

This invention pertains generally to systems, methods, and computer programs for the high-performance encryption and decryption of data, and more particularly to systems, methods, and computer programs for the high-performance encryption and decryption of data in environments when data such as data in large database environments need to be encrypted and/or decrypted in bulk in environments where such encryption/decryption needs to be performed transparently and without any significant changes to existing software code.

BACKGROUND

Numerous methods and techniques are conventionally known for encrypting data or information, including methods and techniques for encrypting data in a database. Database data encryption may represent the more challenging situation because of the large volume of data that may be stored in the database, the need to access or query such data, and the advantages or requirements for speed of access or query that may usually require encryption and/or decryption.

One of the most common conventional methods involves or requires modification of the application or applications that store, manipulate, query, and/or display the data. In this situation, the application may usually be need to be rewritten, modified or changed to call a particular Application Program Interface (API) to a cryptographic services provider that will provide the encryption and/or decryption services. The cryptographic services provider may typically be a software library, an interface to a cryptographic accelerator card, or an interface to a Hardware Security Module (HSM), which may both store keys and accelerate cryptographic operations. One well known example of such an API is the PKCS#11, a cryptographic token interface standard, which provides a generic interface to Hardware Security Modules.

This PKCS#11 standard specifies an API, called Cryptoki, to devices which hold cryptographic information and perform cryptographic functions. The Cryptoki API, follows a simple object-based approach, and attempts to address the goals of technology independence (any kind of device) and resource sharing (multiple applications accessing multiple devices), presenting to applications a common logical view of the device called a cryptographic token. Security and cryptographic standards change and evolve, and this PKCS#11 standard is referenced for purposes of and example, and is not a limitation of the invention or embodiments thereof.

In some limited instances, it is possible to provide a transparent mechanism for securing data. A transparent mechanism is a mechanism which does not require application program modifications or changes, such as discussed above.

One possible way of doing this for data which resides in certain types of databases is described in co-pending U.S. patent application Ser. No. 11/236,061 filed 26 Sep. 2005, entitled "Transparent Encryption Using A Secure Device" naming inventors Brian Metzger. Stephen Mauldin. Bruce Sandell, and Jorge Chang, and assigned to the same assignee as the present application is assigned. Ingrian Networks. Inc. (Redwood City, Calif. USA): which application is incorporated by reference. Alternatively, and at a lower level, it is also possible to encrypt a file, directory, or file system transparently such as is described in co-pending U.S. Provisional Patent Application No. 60/897,802 filed 26 Jan. 2007, entitled "Secure File Encryption System And Method", and assigned to the same assignee as the present application is assigned. Ingrian Networks. Inc. (Redwood City. Calif. USA); which application is incorporated by reference. The first of these applications describes a transparent mechanism for securing data and takes advantage of certain facilities in the various popular databases, especially in the Database Management System (DBMS), known as an "Instead of" trigger, which allows a view to be updatable even though in the definition of the view, UDFs are called. The second application makes use of functionality called filter drivers, which are essentially a hook in the file system to allow data to be modified as it moves in and out of the file system. This latter invention takes advantage of technology and software designed by Ingrian Networks, Inc. to work on a level closer to hardware—the so-called driver level.

Unfortunately, the ability to provide such a transparent mechanism may usually rely on the provision of certain facilities necessary to take advantage of either of the two previously mentioned transparent encryption methods. B way of example, the transparent encryption of databases solution referred to in the above referenced patent application, advantageously makes use of a piece of functionality which may be found in some but not in all databases called "Instead of" triggers. At least some of these so called "Instead of" triggers are a facility for allowing a view to remain updatable even though its definition contains references to UDEs (used to encrypt and decrypt data). These so-called "Instead of" triggers may also be likened to sets of actions defined by an application to run instead of updating of inserting a field into a row of a database table. Since the solution for transparent encryption of databases makes use of views, and requires that at least some of these views be updatable while also containing references to UDFs, this functionality is necessary for operation.

One database in widespread commercial use is the IBM DB2 database. The IBM DB2 database running in the Z/OS operating system environment is an example of a database system that does not support such "Instead of" triggers. Therefore conventional methods and techniques, including those described above, may not be entirely applicable or satisfactory, when applied to the IBM DB2 database on Z/OS, or to databases having the same limitations, whether running in a Z/OS operating system or other operating system environment.

There are also problems and limitations when applying cryptographic functions transparently to other stored data when such data is not in the form of a traditional database, and development of driver-level encryption proves to be impossible or impractical.

Therefore, there remains a need to provide transparent cryptographic functions, including one or both of encryption functions and decryption functions (usually both of these) to be applied to data stored by some operation or mechanism, including but not limited to data stored in a formal or conventional database. More particularly, there remains a need to provide transparent cryptographic functions, for data stored in the IBM DB2 database or similar databases having running in the IBM Z/OS operating system or other operating system presenting similar or analogous limitations relative to support of user-defined triggers, hooks, and functions.

SUMMARY

Figure 1:
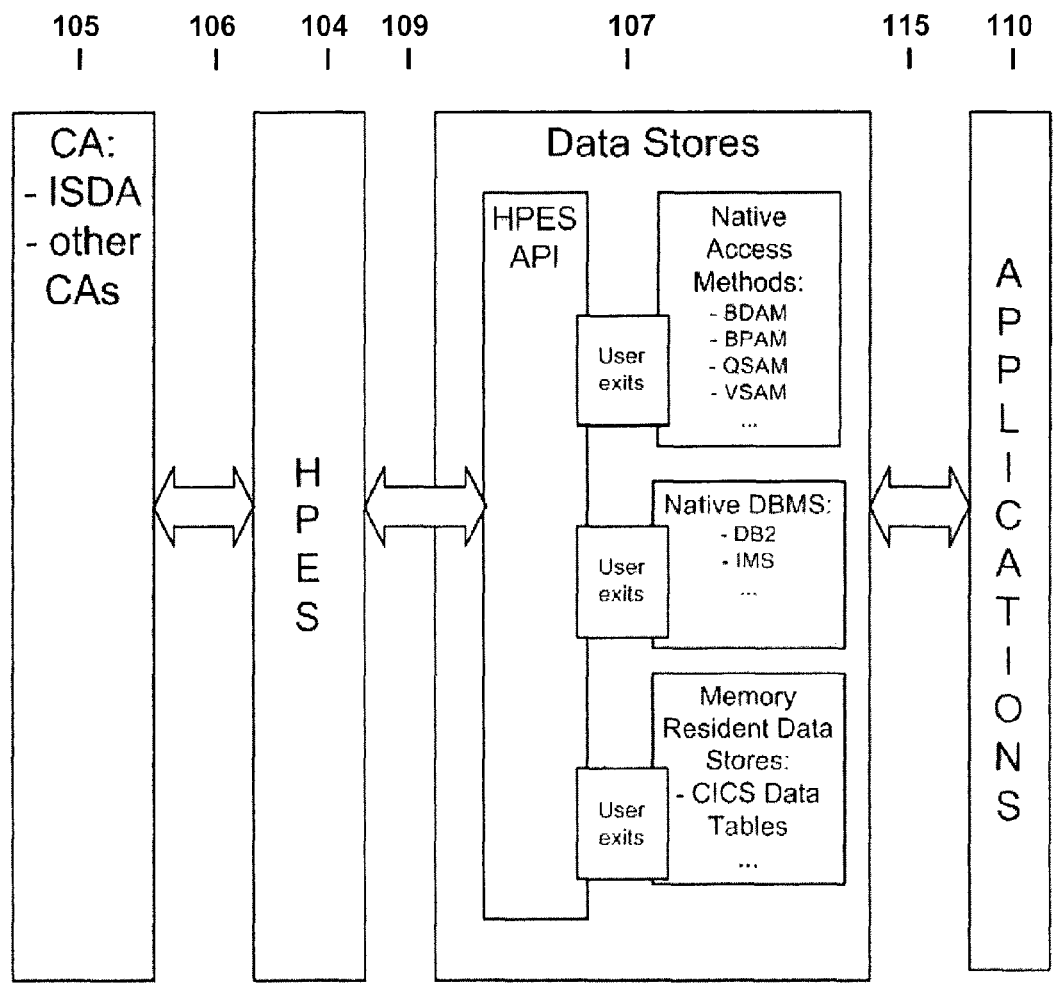
FIG. 1 is an illustration showing a system according to an embodiment of the invention.

In one aspect, embodiments of the invention provide a high-performance data encryption/decryption server and method for transparently encrypting/decrypting data.

In another aspect, embodiments of the invention provide system and method for encryption and/or decryption cryptographic services that have particular applicability to large databases and more particularly to encryption and/or decryption of bulk data such as for bulk data such as bulk data in an IBM DB2 or other database.

In another aspect, embodiments of the invention provide a method for transparently applying a cryptographic operation to application-specific data, the method comprising the steps of: (a) providing an application program interface (API) coupled between a cryptographic appliance (CA) and a data store; (b) specifying a data flow event or location in the data flow in a first computer program code that allow a user to provide a second computer program code to the instantiation of the first program that will be invoked when the data flow reaches the specified data flow event or locations in the flow of data; (c) utilizing the application program interface (API) with the using the specified data flow event or location in the data flow in the first computer program code which permit a cryptographic operation that is performed by a cryptographic appliance (CA) upon request of a server without any awareness by the applications that such cryptographic operation is occurring or has occurred; and (d) using the specified data flow event or location in the data flow in a first computer program code to automatically generate requests for encryption and decryption of data based on the operations performed on a data store for which these data flow event or location are specified transparently to applications which invoke these operations on data stores.

In still another aspect, embodiments of the invention provide an encryption server for transparent encryption and decryption of application specific data, the server comprising: (a) a first interface for coupling with a cryptographic appliance; (b) an application programming interface (API) configured to be called by computer program code executing in a data store and an operating system-specific user exit that is invoked for execution by an operation on the data store; and (c) the server acting as a cryptographic requests broker between data store hooks and cryptographic appliances.

In another aspect, embodiments of the invention provide a method for transparently encrypting application specific data, the method comprising: defining at least one exit routine specific to particular types of data stores; using an application program interface (API) in cooperation with a cryptographic server for serving encrypted and/or decrypted data; and isolating applications accessing the data stores from knowledge, awareness, or participation of the cryptographic server through the use of the API and exit routines.

In yet another aspect, embodiments of the invention provide a computer program stored on a computer readable media for modifying the operation of a computer process implementing a method for transparently encrypting application specific data, the method comprising: defining at least one exit routine specific to particular types of data stores; using an application program interface (API) in cooperation with a cryptographic server for serving encrypted and/or decrypted data; and isolating applications accessing the data stores from knowledge, awareness, or participation of the cryptographic server through the use of the API and exit routines.

In yet another aspect, embodiments of the invention provide a system for transparently encrypting application specific data, the system comprising: means for defining at least one exit routine specific to particular types of data stores; means for using an application program interface (API) in cooperation with a cryptographic server for serving encrypted and/or decrypted data; and means for isolating applications accessing the data stores from knowledge, awareness, or participation of the cryptographic server through use of the API and exit routines.

In another aspect, embodiments of the invention provide a system for transparently applying a cryptographic operation to application-specific data, the system comprising: (a) means for providing an application program interface (API) coupled between a cryptographic appliance and a data store; (b) means for specifying a data flow event or location in the data flow in a first computer program code that allow a user to provide a second computer program code to the instantiation of the first program that will be invoked when the data flow reaches the specified data flow event or locations in the flow of data; (c) means for utilizing the application program interface (API) with the using the specified data flow event or location in the data flow in the first computer program code which permit a cryptographic operation that is performed by a cryptographic appliance (CA) upon request of a server without any awareness by the applications that such cryptographic operation is occurring or has occurred; and (d) means for using the specified data flow event or location in the data flow in a first computer program code to automatically generate requests for encryption and decryption of data based on the operations performed on a data store for which these data flow event or location are specified transparently to applications which invoke these operations on data stores.

DETAILED DESCRIPTION OF EXEMPLARY EMBODIMENTS OF THE INVENTION

The requirement to encrypt data or other information and to provide cryptographic services generally for data and information has become increasingly apparent particularly in light of personal information privacy and corporate trade secret and security concerns in an environment of computer hackers, data mining robots or bots, and other potential theft or compromise of data and information.

Some conventional databases as well as less structured data that may not fall into a traditional database concept, requires or at least increasingly benefits from cryptographic security measures just as much as others, and while it may be possible to custom write or modify an application program or interface specifically for each stored data item or set, database, operating system, and/or stored data set and operating system combination, such a customization will be time consuming and expensive and may need to be performed many times over the life cycle of a particular computer program code or product.

In at least some data storage systems and databases (both of which will henceforth be referred to under the database term for convenience and brevity of description), certain other programmatic features may be present that allow transparent cryptographic operations to be performed, including transparent encryptions, transparent decryption, and/or both relative to database.

While neither the invention nor embodiments of the invention are restricted to either the IBM DB2 database or to the IBM Z/OS operating system or to the combination of the IBM DB2 database running under the IBM Z/OS operating system, these database and operating system components and the combination provides a useful framework for a description of embodiments of the invention. Furthermore, IBM DB2 running under the IBM Z/OS operating system is a popular commercial combination having widespread use so that providing a mechanism, system, method and computer program for this particular combination provides significant advantages over the conventional arts. The IBM Z/OS operating system may be considered as one example of a multiple virtual storage (MVS) or multiple virtual storage like operating system. This MVS operating system was itself a successor to IBM OS/390. It may be noted that IBM, Z/OS, DB2, and OS/390 are registered trademarks of International Business Machines Corporation.

Recall that the IBM DB2 database running in the Z/OS operating system environment is an example of a database system that does not implement such "Instead of" triggers that support transparent cryptographic mechanisms. Fortunately, the DB2 database program running on the Z/OS operating system (and Z/OS operating system in general) does provide a number of so called "hooks" or "callback" computer program constructs (called exit routines in Z/OS user documentation), which are specifically defined places in the flow of data that allows a user to supply computer program code that will be invoked when the data flow reaches the specified place. One example, but by no means the only example or a limitations, would be the process of inserting a row of data into a DB2 database table. Other programs whether database programs, programs involving some form of data storage or retrieval, or otherwise requiring or advantageously employing cryptographic operations, may have computer program constructs like these hooks or callbacks, or that provide similar or analogous features and capabilities, so that they would also be susceptible or benefit from the inventive system, method, computer program, and other aspects and features of embodiments of the invention. Therefore, although embodiments of the invention are described primarily with reference to IBM DB2 and IBM Z/OS operating system, neither the invention as a whole nor embodiments of the invention are limited only to these particular application programs or operating system.

It will also be appreciated in light of the description provided here that the transparent encryption and/or decryption of data in a database or data structure is particularly advantageous for encrypting and/or decrypting large volumes of data, sometimes referred to as bulk data. Circumstances may arise for a variety of reasons that suggest a requirement or at least benefit for bulk loading of data into a database. This may sometimes be referred to as a bulk loader. Co-pending U.S. Provisional Application No. 60/774,897 filed Feb. 16, 2006, entitled "Bulk Data Loader For A DB2 Database" describes particular embodiments of a bulk loader that may advantageously utilize aspects of the present invention. This application is hereby incorporated by reference into the present application.

Embodiments of the present invention are directed to systems, devices, methods, and computer programs for transparently encrypting and decrypting data on systems that provide these hook and/or callback program constructs. These may also be applied to data or information decryption. Usually data encryption and data decryption will be paired in real-world situations but this pairing is not a requirement of at least some embodiments of the invention.

Advantageously, these inventive systems, devices, methods, and computer programs for transparently encrypting data may be applied even when the so called "Instead of" triggers or other program constructs which may be required under other transparent cryptographic (encryption and/or decryption) methods are not available. It will also be appreciated in light of the description provided herein, that the inventive systems, devices, methods, and computer programs for transparently encrypting data may be applied even when the database program and/or operating system has other programmatic constructs or features that would also support alternative transparent cryptography.

Generically speaking, a "hook" or a callback is a program construct that is provided by the producers of a software systems that allows third parties to write code that the system will invoke at the appropriate time to allow the third party to perform additional programmatic operations and/or do things like modify the data, log the data, perform integrity checks, and so on. Callbacks are generally synonymous with hooks. Hooks (or callbacks) are typically automatically invoked when data processing flow reaches a certain pre-defined point. Such constructs in the IBM Z/OS operating system are called "exit routines". The terms "exits" and "exit routines" are names applied to hooks or callbacks (or hook-like or callback-like) program constructs in the IBM Z/OS operating system. In other words, "exit" is a specific example of a "hook" in the IBM Z/OS operating system. Other words or phrases may be applied to similar program constructs to perform these hook or hook-like functions. Therefore, to avoid long lists of alternatives, it will be understood that the term hooks will include callbacks, exits, exit routines, and the like as well as particular examples of these and alternative program constructs or features that may be used in other programs, programming languages, operating systems, or the like now or in the future.

Embodiments of the invention provide for systems, devices, methods, and computer programs that may perform transparent data cryptographic operations, such as encryption and/or decryption of data when appropriate hooks program constructs are available in the operating environment, such as the operating system, the database (if any), and/or the Data Store (if any). Recall that hooks are not computer programs per se, but provide opportunities for third parties to write programs or program code which will or may be executed at specified times or under specified conditions.

For systems, application programs (possibly including but not limited to database application programs such as DB2 or others), providing the appropriate hooks program constructs, data or information of any form may be transparently encrypted or decrypted, and depending on the types of hooks available, this functionality is not limited to databases or even to data storage or retrieval processes or applications but may more generally be applied to cryptographic operations for data stored and/or retrieved by other mechanisms.

Embodiments of the inventive system, device, method, and/or computer program may advantageously provide transparent cryptographic operations for individual data items within a database, data store, or in other applications. However, it may be readily appreciated that embodiments of the inventive system, device, method, and/or computer program may advantageously provide particular benefits to large databases or stored data sets, and in particular, advantages for mass or bulk database operations, such as a database upload, database download, database transfer to an alternative program or system, large scale database query, import, export of other database or data storage or retrieval operation.

Having now described some particular features and advantages of aspects of embodiments of the invention, attention is now directed to a description of specific exemplary non-limiting embodiments.

Embodiments of the invention provide system, device, method, and computer program and computer program product stored in a computer readable form, for transparently encrypting and/or decrypting data in certain types of computer and information processing systems (such as for example, a general or special purpose computer or information processing device or system running an operating system, IBM Z/OS being an example of such an operating system). In some cases or situations, this data may reside in a formal or recognized database structure (such as for example, IBM DB2 running on the IBM Z/OS operating system) or in some other storage system or mechanism (such as for example, data stored in Virtual Storage Access Method or VSAM running the IBM Z/OS operating system or other operating system).

In one aspect, embodiments of the invention provide system, device, method, and/or computer program that provides transparent encryption to end user applications.

In another aspect, embodiments of the invention provide system, device, method, and/or computer program that provides transparent decryption to end user applications.

In yet another aspect, embodiments of the invention provide system, device, method, and/or computer program that provide additional security by protecting the encryption keys on a secured hardware device, while also optionally but advantageously providing the benefit of offloading of cryptographic operations to these secured hardware devices, and optionally but advantageously allowing encryption and/or decryption requests to be load balanced over multiple such devices.

In still another aspect, embodiments of the invention provides provide system, device, method, and/or computer program including an application program interface (API) that allows computer program code to be written which are designed to be invoked by the previously mentioned hooks to access various cryptographic services of any of the types described elsewhere herein and others.

In even still another aspect, embodiments of the invention provides a computer program code structure that may be invoked by such hooks or hook-like program constructs to access such various cryptographic services.

In yet still another aspect, embodiments of the invention provide a High Performance Encryption Server (HPES) for transparent encryption of data.

Other aspects of the invention not specifically recited here may be appreciated from the description and drawings provided elsewhere herein.

It is known that the IBM Z/OS operating system is a proprietary IBM operating system conventionally running specifically on an IBM zSeries hardware architecture. Embodiments of the invention. An inventive encryption and/or decryption server or appliance, which in one inventive embodiment is referred to as a High Performance Encryption Server (HPES) is adapted to provide transparent encryption (and/or decryption) of data residing on, for example, but not limited to, the IBM Z/OS operating system or a Z/OS-like operating system. For convenience and brevity of description, references to encryption will be meant to also apply to decryption. It may also apply to other cryptographic operations. The use of the term cryptographic operations or functions herein will be understood to include data or information encryption which is a primary benefit provided by embodiments of the invention as well as data decryption.

A Z/OS or Z/OS-like (or even the former MVS or MVS-like) operating environment or operating system may provide an underlying operating systems under which the HPES may run or execute. It will be appreciated in light of the description provided herein, that embodiments of the invention may operate or interoperate with the IBM zSeries hardware architecture and/or with the Z/OS operating system, but that the invention is not limited solely to either this architecture or to this operating systems, and that as computer architectures and operating systems change or evolve, embodiments of the invention will have continuing applicability to such changed and evolved systems.

In one non-limiting embodiment of the High Performance Encryption Server (HPES), applications running on an operating system are able to use cryptographic services in a transparent fashion. Cryptographic (or encryption/decryption) transparency meaning that the cryptographic services may be provided, accessed, or utilized with minimal or no computer program software or firmware code changes in the end user applications at all, such as for example in the applications which use the encrypted data. In other words, when appropriate hooks are provided in the underlying software (for example, in the operating system, database software, software in the Data Store, or the like), data may be modified in any way (for example, cryptographically processed, encrypted, decrypted, or processed in a non-cryptographic manner) without needing to make changes to computer program software of firmware in the end user applications. Similarly, data may be modified on its way to whatever database or Data Store is being used without needing to make changes to existing computer programs.

Cryptographic services may by way of example, but not limitation, be provided by cryptographic software and/or firmware, a cryptographic accelerator card or other circuitry or logic in whatever form, or by a dedicated security appliance, or by other cryptographic, encryption and/or decryption services. One such example of a dedicated security appliance is the Ingrian Networks, Inc.—Ingrian Data Secure Appliance (IDSA) made by Ingrian Networks, Inc. of Redwood City, Calif. USA. We conveniently refer to these various hardware, software, firmware, and/or hybrid means for providing security services such as cryptographic services as a cryptographic appliance (CA). This cryptographic appliance is one form of a security appliance as in at least some non-limiting embodiments, the security appliance may perform operations instead of or in addition to cryptography, such as an embodiment in which encryption and/or decryption operations, key management, and user authentication are provided.

In at least one non-limiting embodiment, this application encryption, decryption or more generally cryptographic transparency is achieved through the utilization of user level software or computer program hooks or callbacks provided by the database or data storage means, operating system (OS), or other software or system. These hooks allow a third party applications, such as for example a HPES application described herein, to gain control of execution at selected strategic points in the processing of data or information. As an example, in the IMB Z/OS operating system, these hooks are called or referred to as "exits" or have exit-like features or characteristics. Other operating systems or programming languages may use other terms to describe these hooks or hook-like program constructs or features, and these are included within the scope of the invention. System exits and User exits are particular terms applied to two exit forms that are available in Z/OS and any subsystems running under Z/OS. They are also hooks, but identified with particular specificity in the IMB Z/OS operating system. These same principles, as well as embodiments of the invention, may be applied to other operating systems having such exit program constructs or features or their equivalents.

A given set of data on some storage mechanism or system, including but not limited to conventional databases or other data structures may conveniently be referred to as a Data Store. Encrypted data may frequently tend to be larger in size or volume than non-encrypted data (in predictable ways). Therefore, whatever the database or Data Store that is being encrypted (in whole or in part), changes or adjustments may advantageously need to be made to the particular structures to be encrypted to make them large enough to handle the lager size of the encrypted data set as compared to the non-encrypted data set. (Decryption of a data set if and when performed, may not usually require this adjustment). Depending on the particulars of the database or Data Store, the structure of the data stored within, and the facilities for manipulating such structures, this may be achieved programmatically or may require manual intervention.

With respect to embodiments of the invention described here, exits or exit-like features receive control of the currently executing program thread of control (or control thread) and the data passed to the exit when a request is made to access a given set of data on some storage mechanism or system (referred to here as a Data Store). A Direct Access Storage Device (DASD) on Z/OS is one example of storage mechanism or system that may be characterized as a Data Store under the inventive concept and according to embodiments of the invention described here.

The Data Store concept, as well as systems, devices, methods, and computer programs falling within the concept, may be characterized as an abstraction that describes all the various type of data storage methods that exist on or within an applicable operating system, such as on the IBM Z/OS operating system. Other non-limiting examples of a Data Store are a DB2 table, a VSAM (Virtual Storage Access Method), BPAM (Basic Partitioned Access Method) or BDAM (Basic Direct Access Method) data set, an IMS database, and the like.

A cryptographic server (including embodiments in which the cryptographic server is specifically an encryption server, a decryption server, and/or a server performing encryption and decryption) according to embodiments of the invention, such as the HPES, which receives cryptographic requests (for example data encryption and/or decryption requests) via these operating system hooks is not aware, and does not need to be aware of any data structure definitions. The cryptographic server's responsibility is to relay or otherwise communicate blocks of data back and forth between the data store and a cryptographic appliance, such as an IDSA. Cryptographic services may include by way of example but not limitation, symmetric key encryption and/or decryption, asymmetric key encryption and/or decryption, signing of data, verification of the signed data, and hashing of data.

FIG. 1 is an illustration showing one embodiment of the invention that shows some of the elements of an application-transparent cryptographic processing, such as application-transparent encryption, executing on or within an exemplary IBM Z/OS or Z/OS-like operating system. A system 102 is shown in which a cryptographic server (CS) such as a High-Performance Encryption Server (HPES) 104 interfaces with Cryptographic Appliance (CA) 105 via a first software application program interface (API) call over communications link 106.

This first API (API-1) is a cryptographic provider API for invoking the services of a CA. By way of example, but not limitations these services may be any one or combination of a software library, an accelerator card, or a Hardware Security Module (HSM). The cryptographic server (CS) or HPES 104 also interfaces with Data Store or Data Stores 107 via a second software API call over communications link 109 to a cryptographic appliance (CA) 105. This second API (HPES API) is an API capable of communicating with the HPES.

Categories of cryptographic appliances (CA) may also or alternatively refer to software libraries with no accompanying cryptographic accelerator hardware, software libraries with an accompanying cryptographic accelerator hardware, one or more cryptographic accelerator card(s) (and the software to access the accelerator card), a Hardware Security Module (HSM), or other hardware and/or software to provide cryptographic services possibly including but not limited to data encryption and/or decryption.

In the case of an Hardware Security Module (HSM) cryptographic appliance category or type, this communication capability of API-1 might usually include, for instance, a capability for establishing and authenticating network connections to the HSM, and should optionally but advantageously include a capability for establishing and/or directing connection pooling, retries of failed operations, and/or optional load balancing.

Figure 2:
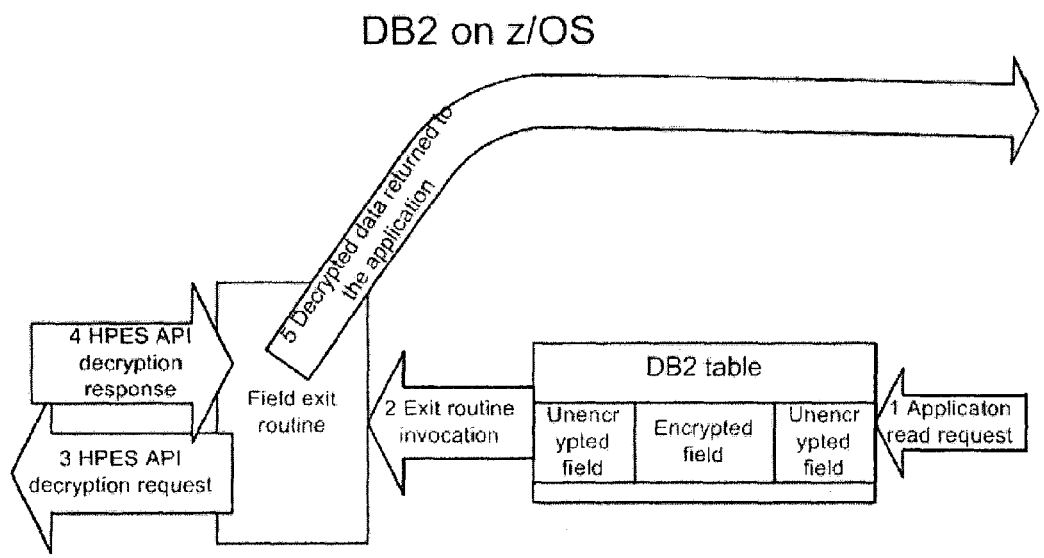
FIG. 2 is an illustration showing a method for application transparent decryption of an encrypted field in a DB2 table using an embodiment of the system of this invention.

A Data Store object may usually and in some configurations will always carry with it or communicate a specific cryptographic operation request, which may be determined by the type of input/output (I/O) operation, such as a read or write operation request, requested on a storage mechanism. Recall that a Direct Access Storage Device (DASD) may be such as storage mechanism or means. If a Data Store object receives a write operation request from an application, the exit defined for this Data Object will then send a request to the CS (e.g., for the HPES) to have its block of data encrypted by the cryptographic service provider such as by the Cryptographic Appliance (CA) prior to that write to the appropriate storage mechanism, so that the data that will be written will be encrypted data. A write operation may, for example be a write to DASD operation, and a read operation may for example be a read from DASD operation. When a write is invoked on a Data Store, the 'write' hook will be invoked, which will in turn communicate with the HPES or (other CS). The HPES will then communicate with the CA in order to get the data to be written encrypted prior to that write to the appropriate storage mechanism, so that the data that will be written will be encrypted data. The inverse applies for a Data Store object that receives a read operation request from an application, or a read invoked on the Data Store object. In that read operation situation, the exit routine associated with the Data Store object will send a request to the CA (e.g., HPES) to have its block of data decrypted by the cryptographic service provider, such as by the Cryptographic Appliance (CA) prior to returning that block to the caller directly from the exit routine, as illustrated in FIG. 2. Note that in this situation, the Data Store 'read' hook will be invoked, and this will in turn communicate with the HPES, which will then communicate with the appropriate CA in order to get the data decrypted, before being passed along to the user application.

FIG. 2 is an illustration showing an exemplary method for application transparent decryption of an encrypted field in a DB2 table using an embodiment of the system of this invention. The DB2 table is used for purposes of illustration and is not a limitation of the invention or of embodiments of the invention. The illustration shows that when an application request for the data read from an encrypted column is received by the database (Step 1), a field exit routine defined for this field is invoked (Step 2), which issues a decryption request to the HPES (Step 3), receives the response from the HPES (Step 4) and then passes the decrypted data to the application (Step 5).

Advantageously, embodiments of the invention provide for system, device, method, and computer program in which computer program code and applications need not to be modified and/or do not need to be made aware of any cryptographic operation issues or details, such as encryption and/or decryption issues and details, as these cryptographic issues and details are completely handled and encapsulated at a much lower level, that is, at the database level (e.g., DB2 level or IMS level) in the case of database encryption, at the VSAM level in the case of VSAM encryption, and so on for the other Data Stores such as for example BPAM, BDAM, VSAM and QSAM, or any other supported Data Stores. Some of these possible Data Stores are also identified in FIG. 1. These cryptographic issues and details, such as encryption issues and details, are handled at the lower system level in that data continues to be passed in to these levels as unencrypted data, and received back from these levels as decrypted data, but when at rest or quiescent in the particular data store, it is encrypted.

It may be understood in light of the description provided herein that each of the different data stores may in some instances possibly require slightly different treatment. But these slightly different treatments are limited, assuming, that is, that the different data stores support the appropriate hooks, namely, allowing a third party (such as for example, a third party company that may provide the code to insert) to insert code to modify the data before it is written to the data store, and to again modify it after it is read out of the data store but before it is passed up to the higher level application.

As a non-limiting example, a DB2 database application running on a Z/OS operating system supports hooks called exits or "exit routines'. The particular exits or exit routines that are of principal interest to the aspects, features, and capabilities of embodiments of the invention, are the so-called "field exit procedures" (or "field procs") and the so-called "edit procedures" (or "edit procs"). Both of these types of exit routine allow a different type of access to data on its way into and out of the data store, such as a DB2 data store. In a row and column based data structure or data base, a Field Exit Procedure type exit routine allows access to data from a single column in a row contained within a particular database or data structure or store table. An Edit Proc, on the other hand, allows for access to an entire row of data.

It may place restrictions on what type of data can be contained in that database column. When the user attempts to write data to a particular row in a table on which a field exit procedure have been defined, before the actual data is written to disk or other storage device or mechanism or means, the "field exit procedure" code executable by the DB2 will be invoked. It will then interface with the cryptographic server, such as the HPES, through the HPES API (See FIG. 1), sending the data for that column to the CS (e.g., to the HPES). In one embodiment, this code may be been supplied by the implementer of the transparency mechanism by means of a of a field exit procedure. The CS such as a embodiment of a HPES will then communicate with the appropriate encryption facility or cryptographic appliance (CA), whether this be as simple as a software library, or as complex as an IDSA (which may for example optionally but advantageously allows for or provide greater cryptographic key security, cryptographic offload, load balancing, and/or error recovery).

When data is retrieved or fetched from a row in that same table, if the value in the encrypted column is to be returned, the field exit routine will again be invoked by DB2, this time allowing the use of the CS (for example, an HPES) to decrypt the data before passing it on to a higher level application, which has issued a read request for the encrypted data. This process is illustrated by FIG. 2. It may be appreciated that the application may be any application or type of application that may use a database, such as an application that may use an IBM DB2 database on a Z/OS operating system.

It may be appreciated that the category or set of relevant applications here is very broad. For example, any application requiring access to sensitive data (hence encrypted data) would be a possibility. In one specific example, the data of interest in the database may be some form of credit card data, but it is not restricted to such credit card data, and the application may be an application that tracks airline reservations, or a consumers purchase history, or anything else that might involving credit card information that exits or might exist in the database.

Alternatively, an edit procedure type exit routine allows for access to all of the data in a row simultaneously. One might then choose, for simplicity of implementation, to encrypt all of the data in the row as a single chunk or block, even if the user has only asked for a particular column of that row to be encrypted. Alternatively, however, it is possible to determine and identify which data in the row belongs to which column of the row, and for this data to be passed off to the CS (e.g., HPES) for processing. In this instance, it is possible to define more than one encrypted column in a table, with each column potentially using different encryption parameters, such as for example a different cryptographic key or different cryptographic algorithm, or both. Other advanced features may also be enabled using these elements.

For different types of storage systems operating within an operating system environment, such as within the IBM Z/OS operating environment, the exact details of the exit routines, possibly including user exits or system exits, provided may vary from storage system to storage system, but the implementation of application-transparent encryption will remain largely the same. The same holds true for other operating systems which provide equivalent functionality, such as the hooks that allow access to the data before writing and after reading. Embodiments of the inventive system, device, method, and computer program are for example expected to directly apply to future hardware architectures and operating systems that are future versions of the IBM "i5" operating system for the IBM "iSeries" hardware and/or hardware architectures, as well as other further hardware architectures and operating systems.

The inventive architecture and methodology of this approach and the advantages thereof will be more readily apparent in the sections to follow. Aspects of the cryptographic server such as a high speed encryption server or HPES 104, cryptographic appliance CA 105, and Data Store(s) 107 and their interaction are now described.

An Exemplary High-Performance Encryption Server (HPES)

The HPES may be a multi-tasking application-neutral server that provides an interface between data (such as for example application-specific data) stored or residing on a storage mechanism, and the cryptographic services provider, such as an IDSA or other cryptographic appliance, cryptographic system, or cryptographic device. One of the main purposes of the HPES 104 is to abstract and encapsulate on either side of its interfaces 106, 109 the particularities of the other side, either the cryptographic appliance or cryptographic service provider 105 or the data store(s) 107. This means that any software or programmatic components running on the application side have no knowledge of the CA side, and vice-versa. The application side includes the data store 107 and any computer, computer system or subsystem, mainframe or the like that couples or may be coupled with the data store 107.

For semantic purposes, the Data Store(s) may be considered to fall on the application side of the system. Non-limiting embodiments of the inventive system may include the Data Store(s), whereas other non-limiting embodiments of the inventive system may exclude the Data Store and treat it as an external entity with which the application 110 accesses or makes use of.

Exemplary Data Stores

The notion of Data Store encapsulates all data access and storage methods available on an operating system or application, which are capable of providing programmatic couplings, hooks (called 'exits' in Z/OS) suitable for use in encrypting and decrypting data. On the exemplary Z/OS operating system, examples of various Data Stores are native access methods, such as by way of example but not limitation BDAM (Basic Direct Access Method), BPAM (Basic Partitioned Access Method), QSAM (Queued Sequential Access Method), VSAM (Virtual Storage Access Method); and, native DBMSs, such as by way of example but not limitation DB2 and IMS. Data Store examples may also include non-DASD data structures, like memory resident data (for example, CICS Data Tables) and any other type of data that can be associated with system and user exit or exit-like constructs (or hook or hook-like constructs), possibly including but not limited to standard system exits and user exits. One possible limitation is that there need to be appropriate hooks (or exits or equivalent program constructs) that the Data Store or other system for which we are trying to provide transparency. The presence of the hooks may be provided by the vendor of the application (such as IBM as the vendor of the DB2 database application and the Z/OS operating system in the examples describe here), and the actual code that gets invoked as an hook, exit, or "exit proc" is provided by the third party (such as by Ingrian Networks, Inc. the assignee this patent application) to implement the inventive transparency methodology.

It may be appreciated that the embodiments of the invention are not limited to any particular Data Store and that the architecture, configuration, and organization of stored elements in the Data Store may not usually limit or constrain the invention and that embodiments of the invention may freely interoperate with a great variety of Data Stores.

An Exemplary Cryptographic Appliance (CA)

The Cryptographic Appliance (CA) may be either network attached, channel attached, host based (whether hardware or software implemented), coupled or intermittently coupled, or of any other known or convenient kind of cryptographic services provider that performs one or more of encryption and/or decryption so long as the HPES can establish a communication link to it. The HPES is not only able to handle various types of CA at the same time, and may in some embodiments be coupled with a plurality of CA of the same or different type, but may also advantageously but optionally also apply load balancing across a plurality of CA as may be determined by various factors, such as for example workload goals, throughput requirements, quality of service type requirements, or other factors alone or in combinations. The load balancing or workload distribution may be statically determined or dynamically determined. HPES can also support a cluster of CAs while other embodiments may support a plurality of clusters, or clusters in combinations with individual CAs. In one non-limiting embodiment of the invention, different CAs or clusters of CAs may be separately responsible for encryption and decryption.

Exemplary HPES Scalability

Advantageously, embodiments of the inventive High-Performance Encryption Server (HPES) 104 are highly-scalable, multi-tasking servers that can adaptively distribute crypto requests depending on resource availability, resource requirements, work requests downstream resource availability, and or other factors or conditions. (It will be apparent that single-tasking servers and/or servers that are not highly scalable may be implemented according to features of the invention but are not preferred). Internally, the HPES comprises pluggable services that are uniquely related to every Data Store. Pluggable services in this context may for example include any one or combination of (for Z/OS) DB2 services, VSAM services, IMS services BDAM services, BPAM services, QSAM services, and/or pluggable services. The unique relationship between HPES pluggable services and any particular Data Store is established by the types of exit routines supported by the Data Store, and the structure of the data stored therein, and may for example include different types of pluggable modules for different types of exit routines, such as described above in the case of Field Exit procedures and Edit Exit procedures within the IBM DB2 database running on the IBM Z/OS operating system. It may be noted relative to terminology that in the IBM Z/OS operating system, "exit routine" or alternatively "user exit" or "system exit" (examples of two different types of exit routine) are generic terms, and the terms "Field Exit Procedures" and "Edit Exit Procedures" are frequently applied as specific terms related to the IBM DB2 database application, although the terminology may be applied in other contexts as well.

Additionally, if so desired or selected, requests for a certain type of Data Store may be routed to certain CAs or clusters of CAs. This may be accomplished by configuring the cryptographic server, such as an HPES, in such a manner that requests that come from a certain type of Data Store go to a particular CA or cluster of CAs while requests coming from another Data Store go elsewhere.

Embodiments of the cryptographic server such as an HPES can also scale by distributing some of its work requests to other nodes in a cluster (for example, to an IBM Parallel Sysplex or other cluster) based on site-specific work load objectives or other factors. This way, each type of service request may be filled or satisfied depending on the requests priority, and the HPES may be able to distribute its load across nodes to best meet its performance goals or other requirements that may be imposed on it.

Headings and sub-headings in this description are provided to guide and assist the reader and are not intended to limit the invention or embodiments of the invention in any way, as aspects, features, and elements of embodiments of the invention may be described throughout the description.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method for transparently applying a cryptographic operation to application-specific data, the method comprising:
   providing an application program interface (API) coupled between a cryptographic server and a data store of an information processing device, the information processing device running at least one of an operating system (OS) and a native database management system (DBMS) that natively contains at least one hook corresponding to a pre-defined OS or native DBMS data flow event or location and operable to invoke third party-provided computer program code when data flow of the OS or DBMS reaches the pre-defined data flow event or location;
   providing the third-party computer program code; and
   responsive to a request from an application related to an input/output (I/O) operation on a storage mechanism that causes data flow of the OS or DBMS to reach the pre-defined data flow event or location, initiating via the API, by the computer program code invoked by the hook, cryptographic processing of an application-specific data item corresponding to the I/O operation request by a cryptographic appliance (CA) coupled to the cryptographic server.

2. The method of claim 1, wherein the cryptographic processing includes at least one of an encryption operation and a decryption operation.

3. The method of claim 1, wherein the API is provided in a server computer.

4. The method of claim 3, wherein the server computer comprises the cryptographic appliance.

5. The method of claim 4, wherein the cryptographic operation comprises a combination of encryption and decryption operations on a data item.

6. The method of claim 4, wherein the cryptographic operation comprises at least one of an encryption operation and a decryption operation.

7. The method of claim 3, wherein the server computer comprises the cryptographic server.

8. The method of claim 7, wherein the cryptographic server performs at least one of an encryption operation and a decryption operation.

9. The method of claim 7, wherein the cryptographic server is adapted to perform both encryption operations and decryption operations.

10. The method of claim 1, wherein the hooks are exit routines.

11. The method of claim 1, wherein at least one of the hooks corresponds to a type of the data store.

12. The method of claim 1, wherein the cryptographic operation comprises an encryption operation when writing to the data store and a decryption operation when reading from the data store.

13. The method of claim 1, wherein the API supports at least one of: (i) cryptographic appliance authentication requests, (ii) encryption and/or decryption requests, and (iii) cryptographic key management requests.

14. The method of claim 1, wherein the API supports encryption and/or decryption requests for providing encryption and/or decryption services.

15. The method of claim 1, wherein the API supports requests for security operations.

16. The method of claim 15, wherein the security operations include at least one of encryption/decryption, encryption key management, and user authentication.

17. The method of claim 1, wherein the hooks comprise at least one of operating system exit routines and operating system read triggers.

18. An encryption server for use in transparent encryption and decryption of application specific data, the server comprising an information processing device having:
   (a) a first interface for coupling with a cryptographic appliance: and
   (b) an application programming interlace (API) configured to be called by computer program code invoked for execution by at least one hook natively provided by one of an operating system (OS) and a native database management system (DBMS), the hook corresponding to a pre-defined OS or native DBMS data flow event or location and operable to invoke the computer program code when, responsive to a request from an application related to an input/output (I/O) operation on a storage mechanism, data now of the OS or DBMS reaches the pre-defined data now event or location, the API used by the computer program code to initiate cryptographic processing of an application-specific data item corresponding to the I/O operation request by the cryptographic appliance;
   wherein the server acts as a cryptographic requests broker between the API and the cryptographic appliance.

19. The encryption server of claim 18, wherein the server acts as broker between the API and a security appliance for performing security operations.

20. The encryption server of claim 18, wherein the application programming interface (API) includes at least one of:
   (i) a user authentication program module;
   (ii) a data encryption and decryption program module; and
   (iii) a cryptographic key management program module.

21. The encryption server of claim 20, wherein the cryptographic appliance is adapted to provide at least one of (i) fast encryption and/or decryption, (ii) user identification and authorization, and (iii) cryptographic key management.

22. A method for transparently encrypting application specific data, the method comprising:
   providing computer program code which, in operation, is invoked by at least one-hook provided natively by and specific to a particular type of operating system (OS) or native database management system (DBMS), the hook corresponding to a pre-defined OS or native DBMS data flow event or location and operable to invoke the provided computer program code; and
   responsive to a request from an application related to an input/output (I/O) operation on a storage mechanism that causes data flow of the OS or DBMS to reach the pre-defined data flow event or location, using the hook to invoke execution of the computer program code to initiate, via an application program interface (API) in cooperation with a cryptographic server, cryptographic processing of data corresponding to the I/O operation request.

23. A non-transitory computer readable storage medium storing computer readable instructions which, when read by a computer, cause the computer to perform a method for transparently encrypting application specific data, the method comprising:
   providing an application program interface (API) coupled between a cryptographic server and a data store of an information processing device, the information processing device running at least one of an operating system (OS) and a native database management system (DBMS) that natively contains at least one hook corresponding to a pre-defined OS or native DBMS data flow event or location and operable to invoke third party-provided computer program code when data flow of the OS or DBMS reaches the pre-defined data flow event or location;

providing the third-party computer program code; and responsive to a request from an application related to an input/output (I/O) operation on a storage mechanism that causes data flow of the OS or DMBS to reach the pre-defined data flow event or location, initiating via the API, by the computer program code invoked by the hook, cryptographic processing of an application-specific data item corresponding to the I/O operation request by a cryptographic appliance (CA) coupled to the cryptographic server.

24. A system for transparently encrypting application specific data, the system comprising:

an information processing device having:

an operating system (OS) natively providing at least one exit routine corresponding to a pre-defined OS data flow event or location, the exit routine associated with at least one of a native data access method, a native database management system, and a memory resident data store, the exit routine responsive to a request from an application related to an input/output (I/O) operation on a storage mechanism that causes data flow of the OS to reach the pre-defined data flow event or location; and an application program interface (API) adapted to send a cryptographic service request based on the at least one exit routine;

an encryption server (ES) initiating a cryptographic service responsive to the cryptographic service request; and a cryptographic appliance (CA) performing the initiated cryptographic service.

* * * * *